United States Patent
Kumagai et al.

(10) Patent No.: US 7,654,435 B2
(45) Date of Patent: Feb. 2, 2010

(54) ROTARY TOOL FOR FRICTION STIR SPOT WELDING AND METHOD OF FRICTION STIR SPOT WELDING USING THE SAME

(75) Inventors: Masaki Kumagai, Nagoya (JP); Kenta Aoki, Ayase (JP)

(73) Assignees: Sumitomo Light Metal Industries, Ltd., Minato-Ku (JP); Obara Corporation, Ayase-Shi (JP)

( * ) Notice: Subject to any disclaimer, the term of this patent is extended or adjusted under 35 U.S.C. 154(b) by 162 days.

(21) Appl. No.: 11/853,887

(22) Filed: Sep. 12, 2007

(65) Prior Publication Data

US 2008/0006677 A1 Jan. 10, 2008

Related U.S. Application Data

(63) Continuation of application No. PCT/JP2006/308092, filed on Apr. 18, 2006.

(30) Foreign Application Priority Data

Apr. 19, 2005 (JP) ............................. 2005-121088

(51) Int. Cl.
*B23K 20/12* (2006.01)
*B23K 37/00* (2006.01)
(52) U.S. Cl. .................................. 228/112.1; 228/2.1
(58) Field of Classification Search ................ None
See application file for complete search history.

(56) References Cited

U.S. PATENT DOCUMENTS

| 5,460,317 | A | 10/1995 | Thomas et al. |
| 5,697,544 | A | 12/1997 | Wykes |
| 6,601,751 | B2 | 8/2003 | Iwashita |
| 2005/0189398 | A1* | 9/2005 | Sato ........................ 228/2.1 |
| 2006/0081679 | A1* | 4/2006 | Sato et al. ................. 228/2.1 |
| 2006/0163316 | A1* | 7/2006 | Burton et al. ............. 228/2.1 |
| 2006/0163328 | A1* | 7/2006 | Subramanian et al. ... 228/112.1 |
| 2006/0169741 | A1* | 8/2006 | Smith et al. .............. 228/2.1 |
| 2007/0152015 | A1* | 7/2007 | Burton et al. ............. 228/2.1 |

FOREIGN PATENT DOCUMENTS

| JP | 2001-259863 A1 | 9/2001 |
| JP | 2001-314983 A1 | 11/2001 |
| JP | 2001-321967 A1 | 11/2001 |
| JP | 2002-120077 A1 | 4/2002 |
| JP | 2003-305576 A1 | 10/2003 |
| JP | 2004-160475 | 6/2004 |

* cited by examiner

*Primary Examiner*—Kiley Stoner
(74) *Attorney, Agent, or Firm*—Burr & Brown

(57) ABSTRACT

A rotary tool for friction stir spot welding including: a rod-like probe to be inserted into one side of stacked planar portions of plural metal members to be joined while being rotated; and a cylindrical shoulder member which is disposed coaxially outwardly of the probe and which has a shoulder surface to be abutted against the one side of the stacked portions while being rotated, wherein the probe and the shoulder member are individual components and are disposed so as to have a double-acting structure which enable them to move independently in their axial direction, and in which a gap between an inner surface of the shoulder member and an outer surface of the probe is formed to have a small gap on a tip side of the rotary tool and to have an enlarged gap having larger clearance than the small gap on a base portion side thereof.

18 Claims, 6 Drawing Sheets

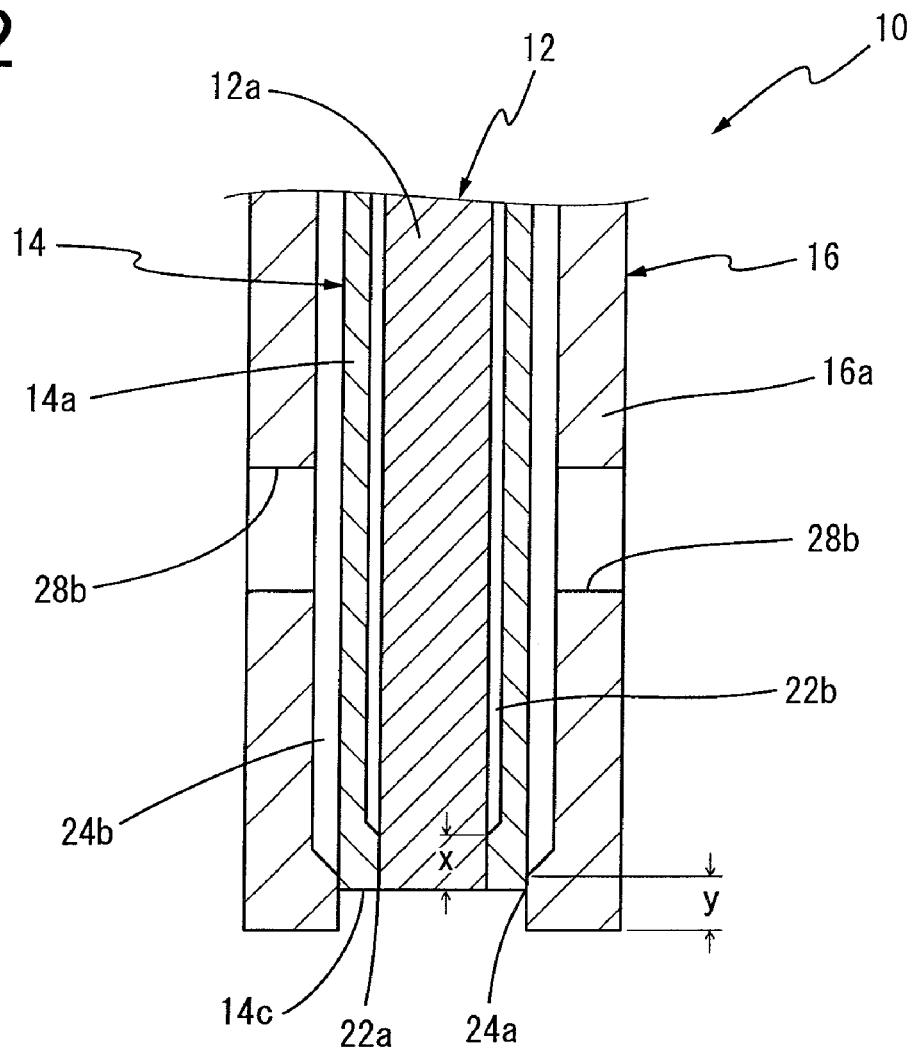

ROTARY TOOL FOR FRICTION STIR SPOT WELDING AND METHOD OF FRICTION STIR SPOT WELDING USING THE SAME

This application is a continuation of the International Application No. PCT/JP2006/308092, filed Apr. 18, 2006, which claims the benefit under 35 U.S.C. § 119(a)-(d) of Japanese Application 2005-121088, filed Apr. 19, 2005, the entireties of which are incorporated herein by reference.

TECHNICAL FIELD

The present invention relates to a rotary tool for friction stir spot welding and a method of friction stir spot welding using the same, and in particularly to a rotary tool for friction stir spot welding having a double-acting structure in which a probe and a shoulder member are individually formed, rotatable around their axes and movable axially independently of each other, as well as an effective method for smoothly continuing a friction stir spot welding operation by using the rotary tool.

BACKGROUND ART

Conventionally, in an automobile manufacturing process, body members and various components of the automobile have been manufactured by stacking a plurality of metal plate members and integrally coupling them by spot-joining operation such as rivet-joining and resistance spot welding. A form of coupling metal plate members by such spot-joining has become employed widely in the fields of various kinds of cars such as railroad cars and transport aircraft such as airplane, as well as in the field of structures or the like such as home electric appliances and construction materials.

Meanwhile, in Patent Document 1 and the like, as a welding method that provides a small amount of heat generation and low levels of softening and deformation during joining operation, a friction stir welding method has been proposed for joining metal members using friction heat. Such a friction stir welding method has been employed to study technology for spot joining stacked portions of a plurality of metal plate members. Thereby, different kinds of methods of friction stir spot welding have been proposed to stably obtain better joint quality and more favorable joint conditions than conventional resistance spot welding and rivet joining (see Patent Documents 2 to 4).

Any of the proposed various methods of friction stir spot welding, however, basically employs a pin-type tool (rotary tool) with a structure in which a pin-shaped hard probe is integrally disposed at a tip of a rod-shaped body of the tool. While being rotated at a high speed, the rotary tool is inserted into the stacked portions of predetermined metal plate members. Then, a shoulder portion formed at the tip of the body of the pin-type tool is pressed onto the stacked portions to generate friction heat between the shoulder portion, the probe and the stacked portions so as to cause a plastic flow of material. Thereby, a stir region is formed around the probe and spot joining of the stacked portions of the metal plate members is performed at an insertion portion for the probe. In the spot joining operation, after completion of the spot joining, the pin-type tool is extracted from the stir region (stir portion) formed in the stacked portions of the metal plate members, which leaves a recessed portion (hole) having a shape corresponding to the insertion portion of the tip of the pin-type tool including the probe. The left hole has caused problems such as liquid accumulation at a time of coating or has internally had a problem of adverse effect on joint strength (strength of a junction) between the metal plate members to be joined.

Therefore, previously in Patent Document 5, one of the inventors of the present invention has disclosed a method using a rotary tool with a double-acting structure in which a probe and a shoulder member are individually formed and independently movable in an axial direction. In this method, the probe and the shoulder member both being rotated are respectively inserted (protruded) into or abutted against the stacked portions of metal plate members to be joined to form a friction stir region in the stacked portions. After joining together the plurality of metal plate members, while extracting the probe from the friction stir region, the shoulder member is moved ahead to press against a surface of the friction stir region so as to allow peripheral material of the friction stir region to flow into a probe hole. Thereby, the probe hole is buried and the probe becomes flush with a shoulder surface of the shoulder member. Then, the rotary tool is removed from the stacked portions.

However, the friction stir spot welding using the double-acting rotary tool has a characteristic that the single rotary tool is adaptable to different thicknesses of the metal plate members to be joined and a hole to be left after removal of the probe in a joint portion formed in the friction stir region can be effectively avoided. Thereby, the method can also provide characteristics that can effectively solve the problems such as reduced joint strength and liquid accumulation during coating. However, due to the double-acting structure of the employed rotary tool, the presence of a clearance (gap) is inevitable between the probe and the shoulder member. Consequently, material of the metal plate member to be joined included in the friction stir region (joint portion) enters and adheres to the clearance. This causes intrinsic problems in which the probe and the shoulder member have difficulty in operating (moving) independently of each other and thereby repetition of friction stir spot welding operation becomes impossible.

The following are reference documents of the related art of the present invention:

Patent Document 1: U.S. Pat. No. 5,460,317
Patent Document 2: JP-A-2001-321967
Patent Document 3: U.S. Pat. No. 6,601,751 B2
Patent Document 4: JP-A-2002-120077
Patent Document 5: JP-A-2001-259863

DISCLOSURE OF THE INVENTION

Problem to be Solved by the Invention

The present invention has been made in the light of the above-mentioned situation. It is therefore an object of the present invention to provide a rotary tool for friction stir spot welding that can effectively alleviate or prevent the problems caused by the adhesion of material entering a clearance or the like between a probe and a shoulder member so as to smoothly repeat friction stir spot welding operation. It is another object of the present invention to provide an effective method for ejecting the material entered between the probe and the shoulder member outside in the operation of friction stir spot welding using the rotary tool.

Means for Solving the Problem

The above-indicated object relating to the rotary tool may be achieved according to an aspect of the present invention, which provides a rotary tool for friction stir spot welding comprising: a rod-like probe to be inserted into one side of stacked planar portions of a plurality of metal members to be joined while being rotated; and a cylindrical shoulder member which is disposed outwardly of the probe so as to be located coaxially with the probe and which has a shoulder surface to be abutted against a surface of the one side of the stacked portions while being rotated, wherein the probe and the shoulder member are individual components respectively and are disposed so as to have a double-acting structure which enable the probe and the shoulder member to move independently in their axial direction, and wherein a gap between an inner peripheral surface of the shoulder member and an outer peripheral surface of the probe is formed to have a small gap on a tip side of the rotary tool and is formed to have an enlarged gap having larger clearance than the small gap on a base portion side thereof.

Furthermore, another aspect of the present invention is to provide a rotary tool for friction stir spot welding comprising: a rod-like probe to be inserted into one side of stacked planar portions of a plurality of metal members to be joined while being rotated; a cylindrical shoulder member which is disposed outwardly of the probe so as to be located coaxially with the probe and which has a shoulder surface to be abutted against a surface of the one side of the stacked portions while being rotated; and a cylindrical pressing member which is disposed coaxially outwardly of the shoulder member, and a tip surface of the pressing member is pressed against the surface of the one side of the stacked portions by a biasing force applied in an axial direction of the pressing member, and wherein the probe and the shoulder member are individual components respectively and are disposed so as to have a double-acting structure which enable the probe and the shoulder member to move independently in their axial direction, and wherein a gap between an inner peripheral surface of the pressing member and an outer peripheral surface of the shoulder member, or along with such gap, a gap between an inner peripheral surface of the shoulder member and the outer peripheral surface of the probe is formed to have a small gap on a tip side of the rotary tool and is formed to have an enlarged gap having larger clearance than the small gap on a base portion side thereof.

In addition, the above-indicated object relating to the method of friction stir spot welding may be achieved according to another aspect of the present invention, which provides a method of friction stir spot welding using the rotary tool for friction stir spot welding according to the above present invention comprising the steps of: performing a friction stir spot welding operation on stacked planar portions of a plurality of metal members to be joined; and repeating insertion and extraction movements of the probe and the shoulder member in their axial direction relative to each other so as to facilitate or encourage ejection of the material debris of the metal members to be joined that are flown into the gap from a friction stir region of the stacked portions and accumulated or adhered thereinto.

Furthermore, another aspect of the present invention is to provide a method of friction stir spot welding using the rotary tool for friction stir spot welding according to the above present invention comprising the steps of: performing a friction stir spot welding operation on stacked planar portions of a plurality of metal members to be joined; and repeating insertion and extraction movements of the shoulder member and the pressing member in their axial direction relative to each other so as to facilitate ejection of the material debris of the metal members to be joined that are flown into the gap from a friction stir region of the stacked portions and accumulated or adhered thereinto.

Furthermore, another aspect of the present invention is to provide a method of friction stir spot welding using the rotary tool for friction stir spot welding according to the above present invention comprising the steps of: performing a friction stir spot welding operation on stacked planar portions of a plurality of metal members to be joined; and repeating insertion and extraction movements of the probe and the shoulder member and insertion and extraction movements of the shoulder member and the pressing member in their axial direction relative to each other so as to facilitate ejection of the material debris of the metal members to be joined that are flown into the gap from a friction stir region of the stacked portions and accumulated or adhered thereinto.

Advantageous Effect of the Invention

Accordingly, in the rotary tool for friction stir spot welding according to the present invention, the double-acting structure of the probe and the shoulder member is employed. Even though the gap is present between them, that is, between the outer peripheral surface of the probe and the inner peripheral surface of the shoulder member, the gap is formed to have a small gap on the tip portion side, and is formed to have an enlarged gap having larger clearance on the base portion side. Thereby, when a plastically fluidized material enters the gap between the probe and the shoulder member of the rotary tool from the friction stir region (joint portion) formed in the stacked portions formed by stacking the planar portions of the metal members to be joined, the presence of the small gap on the tip portion side can suppress the entry of the material, while the material that has once entered the gap is introduced into the enlarged gap with the large clearance. This can effectively suppress or prevent troubles caused by the adhesion and accretion of the material in the gap between the probe and the shoulder member.

In addition, the effects and advantages obtained by the employment of the above gap structure can also be obtained similarly, even when the gap formed between the inner peripheral surface of the pressing member and the outer peripheral surface of the shoulder member includes a combination of the small gap and enlarged gap in the rotary tool for friction stir spot welding having the double-acting structure in which the cylindrical pressing member is disposed outwardly of the shoulder member. Therefore, the presence of the small gap can effectively suppress the entry of the plastically fluidized material of the friction stir portion into the gap between the pressing member and the shoulder member. At the same time, due to the presence of the enlarged gap positioned behind the small gap, even if material flows into, it can be favorably introduced into the base portion side of the rotary tool, whereby troubles caused by material adhesion can effectively be alleviated or prevented.

In addition, according to the method of friction stir spot welding according to the above present invention, after performing friction stir spot welding operation using the rotary tool for friction stir spot welding according to the present invention, the probe and the shoulder member and/or the shoulder member and the pressing member are repeatedly inserted and extracted so as to be moved axially relatively to each other. This can effectively facilitate ejection of material debris of the metal members to be joined that are flown into the gap between the probe and shoulder member and/or the gap between the shoulder member and the pressing member from the friction stir region of the stacked portions formed therein and accumulated or adhered thereto. This allows smooth friction stir spot welding operation and can more favorably increase a repeatable frequency that permits continuous friction stir spot welding operation.

BRIEF DESCRIPTION OF THE DRAWINGS

FIG. 2 is an enlarged view of a tip portion of the rotary tool shown in FIG. 1.

DESCRIPTION OF REFERENCE NUMERALS

Figure 1:
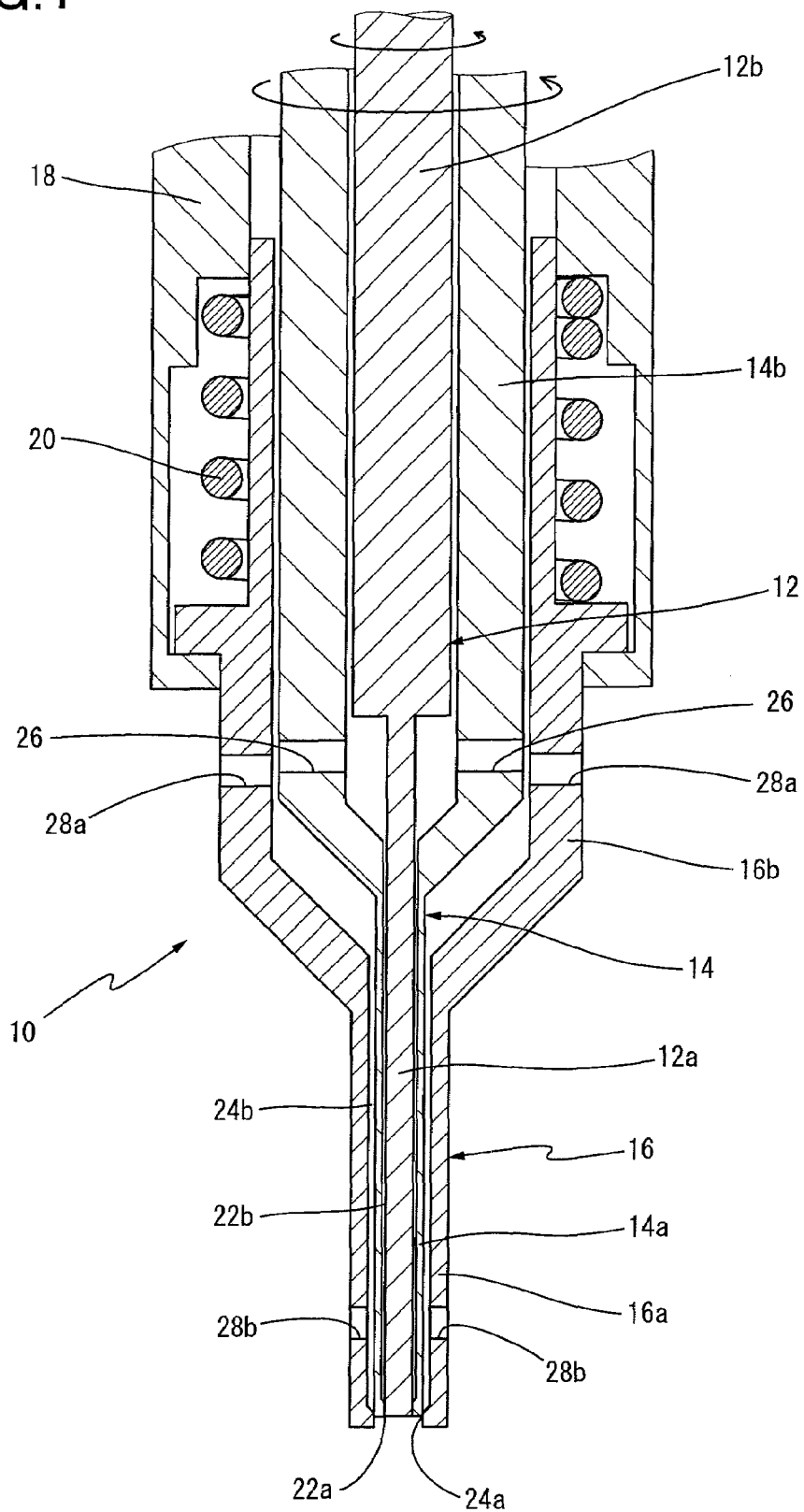
FIG. 1 is an elevational view in axial cross section showing an example of a rotary tool for friction stir spot welding according to the present invention.

| 10 | rotary tool | 12 | probe |
|---|---|---|---|
| 12a | probe tip portion | 12b | probe base portion |
| 14 | shoulder member | 14a | shoulder tip portion |
| 14b | shoulder base portion | 16 | pressing member |
| 16a | pressing tip portion | 16b | pressing base portion |
| 18 | cylindrical supporting member | | |
| 20 | compressing coil spring | | |
| 22a | small gap | 22b | enlarged gap |
| 24a | small gap | 24b | enlarged gap |
| 26, 28a, 28b | ejection hole | 30 | backing jig |
| 32, 34 | metal plate | 36 | friction stir region |
| 38 | probe hole | 40 | joint portion |
| 42 | pressing member | 44 | supporting member |
| 46 | stay | | |

Forms of the Invention

In order to solve the problems described above or problems comprehended based on the entire description of the specification and the drawings, the present invention can be favorably implemented in the various forms as stated below. The respective forms described below can be employed with arbitrary combinations thereof. Additionally, it should be understood that the forms and technical features of the present invention are not limited to those described below and are recognizable based on the idea of the invention disclosed in the description of the entire specification and the drawings.

(1) A rotary tool for friction stir spot welding, comprising: a rod-like probe to be inserted into one side of stacked planar portions of a plurality of metal members to be joined while being rotated; and a cylindrical shoulder member which is disposed outwardly of the probe so as to be located coaxially with the probe and which has a shoulder surface to be abutted against a surface of the one side of the stacked portions while being rotated, wherein the probe and the shoulder member are individual components respectively and are disposed so as to have a double-acting structure which enable the probe and the shoulder member to move independently in their axial direction, and wherein a gap between an inner peripheral surface of the shoulder member and an outer peripheral surface of the probe is formed to have a small gap on a tip side of the rotary tool and is formed to have an enlarged gap having larger clearance than the small gap on a base portion side thereof.

(2) The rotary tool for friction stir spot welding according to the above form (1), wherein a cylindrical pressing member is disposed coaxially outwardly of the shoulder member, and a tip surface of the pressing member is pressed against the surface of the one side of the stacked portions by a biasing force applied in an axial direction of the pressing member, and wherein a gap between an inner peripheral surface of the pressing member and an outer peripheral surface of the shoulder member is formed to have a small gap on the tip side of the rotary tool and is formed to have an enlarged gap having larger clearance than the small gap on the base portion side thereof.

In this manner, in the rotary tool for friction stir spot welding, when the gap is inevitably formed not only between the probe and the shoulder member but also between the shoulder member and the pressing member, for both of those two gaps, employing the combination structure of the small gap and the enlarged gap according to the present invention allows effective prevention of the occurrence of troubles due to material adhesion, thereby resulting in further lifespan extension of the rotary tool for use.

(3) A rotary tool for friction stir spot welding, comprising: a rod-like probe to be inserted into one side of stacked planar portions of a plurality of metal members to be joined while being rotated; a cylindrical shoulder member which is disposed outwardly of the probe so as to be located coaxially with the probe and which has a shoulder surface to be abutted against a surface of the one side of the stacked portions while being rotated; and a cylindrical pressing member disposed coaxially outwardly of the shoulder member, and a tip surface thereof to be pressed against the surface of the one side of the stacked portions by a biasing force applied in its axial direction, wherein the probe and the shoulder member are individual components respectively and are disposed so as to have a double-acting structure which enable the probe and the shoulder member to move independently in their axial direction, and wherein a gap between an inner peripheral surface of the pressing member and an outer peripheral surface of the shoulder member is formed to have a small gap on a tip side of the rotary tool and is formed to have an enlarged gap having larger clearance than the small gap on a base portion side thereof.

(4) The rotary tool for friction stir spot welding according to any one of the above forms (1) to (3), in which the small gap is formed with a length of 0.1 to 10 mm axially from the tip.

(5) The rotary tool for friction stir spot welding according to any one of the above forms (1) to (4), in which an ejection hole penetrating through a cylindrical wall of the shoulder member is formed in an enlarged gap formation region of the shoulder member so as to eject material debris of the metal members to be joined entered through the small gap outwardly through the ejection hole.

As in this form, by providing the ejection hole in the enlarged gap formation region of the shoulder member, the material debris that entered the gap between the shoulder member and the probe and is crumbled into minute powdery pieces can be effectively ejected outside. Thus, accumulation of the material debris in the gap can be effectively prevented.

(6) The rotary tool for friction stir spot welding according to any one of the above forms (2) to (4), in which an ejection hole penetrating through a cylindrical wall of the pressing member is formed in a formation region of the enlarged gap of the pressing member so as to eject material debris of the metal members to be joined entered through the small gap outwardly through the ejection hole.

Also in this form, similarly to the above described form (5), by providing the ejection hole in the enlarged gap formation region of the pressing member, the material debris entering the gap between the shoulder member and the pressing member and is crumbled into minute powdery pieces can be effectively ejected outside. Thus, accumulation of the material debris in the gap can be effectively prevented.

(7) An apparatus for friction stir spot welding comprising the rotary tool for friction stir spot welding according to any one of the above forms (1) to (6).

(8) A method of friction stir spot welding using the rotary tool for friction stir spot welding according to any one of the above forms (1) to (6), in which the method comprising the steps of: performing a friction stir spot welding operation on stacked planar portions of a plurality of metal members to be joined; and repeating insertion and extraction movements of the probe and the shoulder member in their axial direction relative to each other so as to facilitate ejection of the material debris of the metal members to be joined that are flown into the gap from a friction stir region of the stacked portions and accumulated or adhered thereinto.

(9) A method of friction stir spot welding using the rotary tool for friction stir spot welding according to any one of the above forms (2) to (6), in which the method comprising the steps of: performing a friction stir spot welding operation on stacked planar portions of a plurality of metal members to be joined; and repeating insertion and extraction movements of the shoulder member and the pressing member in their axial direction relative to each other so as to facilitate ejection of the material debris of the metal members to be joined that are flown into the gap from a friction stir region of the stacked portions and accumulated or adhered thereinto.

(10) A method of friction stir spot welding using the rotary tool for friction stir spot welding according to any one of the above forms (2) to (6), in which the method comprising the steps of: performing a friction stir spot welding operation on stacked planar portions of a plurality of metal members to be joined; and repeating insertion and extraction movements of the probe and the shoulder member and insertion and extraction movements of the shoulder member and the pressing member respectively in their axial direction relative to each other so as to facilitate ejection of the material debris of the metal members to be joined that are flown into the gap from a friction stir region of the stacked portions and accumulated or adhered thereinto.

(11) The method of friction stir spot welding according to any one of the above forms (8) to (10), in which the operation of the insertion and extraction movements is performed after the friction stir spot welding operation is performed a plurality of times.

In this manner, after the plurality of times of the friction stir spot welding operation were performed, the insertion and extraction movements of the probe, the pressing member and the like is repeated. This allows continuous repetition of the friction stir spot welding operation, while preventing the occurrence of troubles caused by material adhesion.

BEST MODE FOR CARRYING OUT THE INVENTION

In order to clarify further details of the present invention, an embodiment of the present invention will be described hereinafter with reference to the drawings.

First, FIG. 1 schematically shows an example of a rotary tool for friction stir spot welding according to the present invention. FIG. 2 illustrates an enlarged view of a tip portion of the rotary tool for friction stir spot welding shown in FIG. 1. In those drawings, a rotary tool 10 for friction stir spot welding is formed with a structure in which a rod-like probe 12, a cylindrical shoulder member 14 and a pressing member 16 similarly having a cylindrical shape are coaxially arranged in such a form that the shoulder member 14 is disposed outwardly of the probe 12 and then the pressing member 16 is disposed outwardly of the shoulder member 14, such that the probe 12 becomes a center member.

Specifically, the probe 12 is formed by integrally forming a probe tip portion 12a having a round bar-like shape with an elongated slim diameter on a lower side in the drawing and a probe base portion 12b having a round bar-like shape on a base portion side thereof (an upper side in the drawing) with a diameter larger than that of the probe tip portion 12a. The probe 12 is arranged so as to be positioned at a center of the rotary tool 10. As a conventional art, the probe 12 can be rotated around its axis at a high speed by a rotary driving apparatus (not shown) connected to the side of the probe base portion 12b and can be reciprocated axially (protruding and retracting operation).

In addition, the shoulder member 14 is also formed by integrally forming a shoulder tip portion 14a having a cylindrical shape with a small diameter and a thin thickness extending axially in a length slightly shorter than that of the probe tip portion 12a and a shoulder base portion 14b positioned on its base portion side and having a cylindrical shape with a larger diameter and a greater thickness than those of the shoulder tip portion 14a, and the shoulder member 14 is disposed outwardly of the probe 12. As in the case of the probe 12, the shoulder member 14 can be rotated around its axis at a high speed by a rotary driving system (not shown) in sync with the probe 12 or independently therefrom, as well as can be reciprocated axially (protruding and retracting operation). In addition, a tip surface of the shoulder tip portion 14a, which is abutted or pressed against the metal member to be joined, is set as a shoulder surface 14c. At least a portion that contacts the metal member to be joined in the shoulder tip portion 14a of the shoulder member 14 is made of a material harder than that of the metal members to be joined (stacked portions), as well as at least a portion contacting with the metal member to be joined in the probe tip portion 12a of the probe 12. For example, in a case of the metal members to be joined are made of aluminum, the portions may be made of steel.

In addition, the pressing member 16, which serves to press down burrs, is formed by integrating a cylindrical pressing tip portion 16a with a small diameter and a thin thickness extending axially in a length slightly shorter than that of the shoulder tip portion 14a of the shoulder member 14 and a cylindrical pressing base portion 16b with a large diameter and a thick thickness positioned on its base portion side. When a compression coil spring 20, which is arranged between a cylindrical supporting member 18 disposed at a fixed position and the pressing base portion 16b, moves the pressing member 16 from a state shown in FIG. 1 in an axially upward direction, a predetermined downwardly biasing force can be generated. The pressing member 16 is different from the foregoing probe 12 and shoulder member 14 in that it can maintain its static state without being rotated during a friction stir spot welding operation which will be described below.

Then, as shown in FIG. 1, the shoulder member 14 is inserted so as to be positioned in an inner hole of the pressing member 16 and also the probe 12 is inserted to be positioned in an inner hole of the shoulder member 14, whereby the three members 12, 14 and 16 are arranged coaxially.

Meanwhile, in the rotary tool 10 configured as described above, a double-acting structure is employed in which the probe 12 and the shoulder member 14 are individually formed and independently movable in their axial direction. Thus, between the probe 12 and the shoulder member 14, as well as between the shoulder member 14 and the pressing member 16, a small clearance (gap) is inevitably formed so as to allow the members to move in their axial direction and rotate around their axes. Then, material from a friction stir region of the metal members to be joined will enter even in such a small gap, resulting in causing a problem of adhesion.

For that reason, in the present embodiment of the invention, as shown in the enlarged view of FIG. 2, a gap between an outer peripheral or circumferential surface of the probe tip portion 12a of the probe 12 and an inner peripheral or circumferential surface of the shoulder tip portion 14a of the shoulder member 14, which is positioned at the tip portion of the rotary tool 10, is formed as a small gap 22a on the tip portion side thereof and which is positioned on the base portion side thereof is formed as an enlarged gap 22b larger than the small gap 22a. Additionally, a gap between an outer peripheral or circumferential surface of the shoulder tip portion 14a of the shoulder member 14 and an inner peripheral or circumferential surface of the pressing tip portion 16a of the pressing member 16 is also formed as a small gap 24a on the tip side thereof, on the other hand, the gap is formed as an enlarged gap 24b larger than the small gap 24a on the base portion side thereof. In this case, the inner peripheral surface of the shoulder tip portion 14a of the shoulder member 14 and the inner peripheral surface of the pressing tip portion 16a of the pressing member 16 are each formed as a stepped surface with a diameter larger on the base portion side than on the tip side, whereby the two enlarged gaps 22b and 24b having large clearance are respectively formed between the outer peripheral surface of the probe tip portion 12a of the probe 12 and between the outer peripheral surface of the shoulder tip portion 14a of the shoulder member 14. Furthermore, as shown in FIG. 1, the enlarged gaps 22b and 24b are respectively extended to the base portion side in the stepped structure so as to be also respectively formed between the probe base portion 12b and the shoulder base portion 14b and between the shoulder base portion 14b and the pressing base portion 16b, respectively.

Accordingly, in the tip portion structure of the rotary tool 10, even when material of the friction stir region formed in the metal members to be joined enters the gap between the probe tip portion 12a and the shoulder tip portion 14a and the gap between the shoulder tip portion 14a and the pressing tip portion 16a through the small gaps 22a and 24a, the material is each introduced into the enlarged gaps 22b and 24b having large clearances positioned on the base portion side. Then, those gaps 22b and 24b serve as pockets for accommodating such material debris, so that the entered material results in being ejected. Accordingly, the entered material does not adhere over the entire outer peripheral surface of the probe tip portion 12a and the entire inner peripheral surface of the shoulder tip portion 14a. Similarly to that, an entire-surface adhesion between the outer peripheral surface of the shoulder tip portion 14a and the inner peripheral surface of the pressing tip portion 16a can also be effectively prevented or suppressed. As a result, inhibitions of the rotational operation and reciprocating movement of the probe 12 and the shoulder member 14 can be favorably prevented or alleviated. Moreover, even when adhesion occurs in each of the small gaps 22a and 24a, a region of the adhesion can be controlled by appropriately selecting an axial length of each of the small gaps 22a and 24a. Thus, without requiring large power, the probe 12 and the shoulder member 14 can be rotated during the friction stir spot welding operation. Also, rotational speeds of the probe 12 and the shoulder member 14 can be made different from each other. Consequently, adhesion in the small gaps 22a and 24a cab be prevented.

The small gaps 22a and 24a are, depending on the sizes of their clearances, provided in such axial lengths that can prevent the occurrence of troubles due to the adhesion of the entered material. The axial lengths x and y generally ranges from 0.1 to 10 mm, and preferably ranges approximately from 1 to 8 mm. If the axial lengths x and y are excessively short, it is difficult to form those gaps. Conversely, in a case of excessively long lengths, the material entered the small gaps 22a and 24a causes adhesion between the members, thereby increasing the risk of occurrence of an operational defect. In FIG. 2, the axial length y of the small gap 24a between the outer peripheral surface of the shoulder tip portion 14a and the inner peripheral surface of the pressing tip portion 16a is set as the axial length of a small-diameter portion at the tip of the pressing tip portion 16a. This is because, during the friction stir spot welding operation, the tip surface of the pressing tip portion 16a is flush with the shoulder surface 14c which is the tip surface of the shoulder tip portion 14a.

Clearance sizes of the small gaps 22a and 24a are preferably as small as possible so as to suppress the entry of plastically flowing material at a friction stir region. The sizes thereof generally range approximately from 0.05 to 0.5 mm, and preferably range approximately from 0.1 to 0.4 mm. It is because, if the small gaps 22a and 24a have a large clearance, it increases the amount of material entering there and easily causes a trouble such as adhesion.

Furthermore, on the position nearer to the base portion side of the rotary tool 10 in relation to the small gaps 22a and 24a, the enlarged gaps 22b and 24b are formed so as to provide clearances larger than those of the small gaps 22a and 24a. Thereby, the enlarged gaps 22b and 24b are adapted to accommodate the material entering from the small gaps 22a and 24a, and additionally, are adapted to serve as pockets for ejecting the material outside the tool, as will be described below. In order to perform those functions favorably, their clearance sizes may be set to be favorably 0.5 mm or larger, and preferably 1 mm or larger. In this case, surfaces reaching from the small gaps 22a and 24a up to the enlarged gaps 22b and 24b, as clearly shown here in FIGS. 1 and 2, that is, surfaces of transition from small-diameter portions up to large-diameter portions on the inner peripheral surface of the shoulder tip portion 14a of the shoulder member and the inner peripheral surface of the pressing tip portion 16a of the pressing member are formed as inclined planes. Thereby, the material entered the small gaps 22a and 24a can be smoothly introduced into the enlarged gaps 22b and 24b. Furthermore, as shown in FIG. 1, the enlarged gaps 22b and 24b are extended as the large-diameter gaps onto the base portion side of the rotary tool 10 by a tapered inner peripheral surface continuing from the shoulder tip portion 14a to the shoulder base portion 14b and a tapered inner peripheral surface continuing from the pressing tip portion 16a to the pressing base portion 16b.

In addition, in the rotary tool 10 as configured above, an ejection or discard hole with a predetermined size is formed so as to penetrate through a cylindrical wall of each member in each of the formation regions of the enlarged gap 22b of the shoulder member 14 and the formation region of the enlarged gap 24b of the pressing member 16, whereby material debris made up of powdery particles produced by the material of the friction stir region entered through the small gaps 22a and 24a are ejected outside through the ejection holes. In the present embodiment, as the ejection holes, an ejection hole 26 penetrating through the cylindrical wall of the shoulder base portion 14b with the large diameter is formed in the shoulder member 14 and an ejection hole 28a penetrating through the cylindrical wall of the pressing base portion 16b with the large diameter is formed in the pressing member 16. Furthermore, also in the pressing tip portions 16a with the small diameters, a plurality of ejection holes 28b penetrating through the cylindrical walls thereof are formed so as to be positioned in formation regions of the enlarged gaps 24b.

As described above, by forming the ejection holes 26, 28a and 28b in the shoulder member 14 and the pressing member 16, the material entering through the respective small gaps 22a and 24a is crumbled into powdery pieces due to high-speed rotations of the probe 12 and the shoulder member 14 in the pressing member 16 which is in a non-rotating state, and is introduced into the respective enlarged gaps 22b and 24b, therefore they are present as material debris. Then, the material debris made up of the minute powdery pieces is ejected outside through the respective ejection holes 26, 28a and 28b. As for the sizes of the ejection holes 26, 28a and 28b, the holes are generally formed as through-holes with diameters ranging approximately from 3 to 10 mm so that the holes can effectively perform their function.

Now, when a friction stir spot welding operation is performed on stacked planar portions of a plurality of metal members to be joined with the rotary tool 10 according to the present invention, for example, it may be performed according to steps as shown in FIG. 3 to FIG. 4.

Incidentally, in FIG. 3, on a backing jig 30, there are placed two metal plates 32 and 34 that form the planar portions of the metal members to be joined by friction stir spot welding, in a state of being stacked on each other longitudinally. Then, as in the conventional art, those plates are clamped at a fixed position. Additionally, both of the two metal plates 32 and 34 are made of a metal material which is capable of friction stir welding, and for example, they may be made of aluminum, an aluminum alloy, copper, a copper alloy, iron, an iron alloy or the like. Furthermore, for the metal plates 32 and 34, the same material or different materials may be appropriately selected.

Figure 3A:
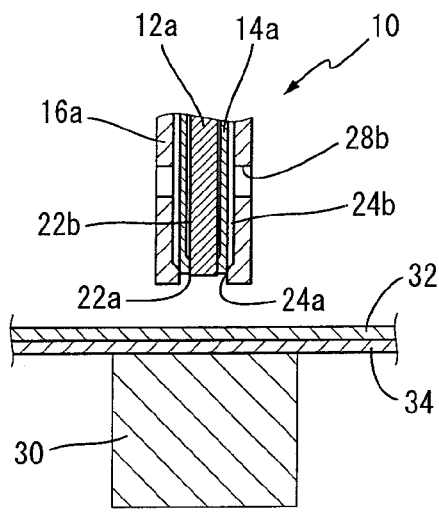
FIG. 3 are illustrations showing a first half of process of a method of friction stir spot welding using the rotary tool according to the present invention, in which 3A, 3B and 3C are explanatory views showing a form of each step respectively.
Figure 3B:
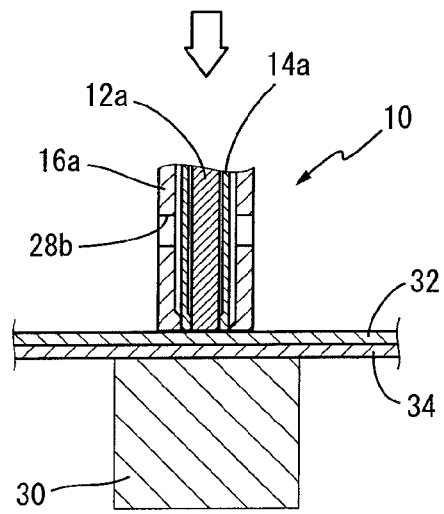
Figure 3C:
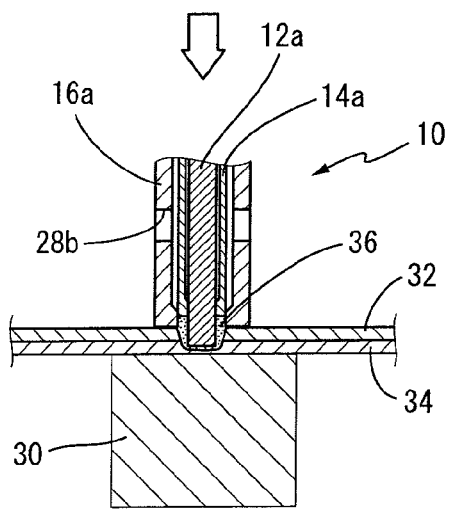

At an beginning of the friction stir spot welding operation, as shown in FIG. 3A, in a state in which the tip portion of the rotary tool 10 is positioned above the stacked portions of the metal plates 32 and 34, the probe 12 (the probe tip portion 12a) and the shoulder member 14 (the shoulder tip portion 14a) are both rotated at a high speed, and under the condition, the tip portion of the rotary tool 10 is descended. Next, after the tip surface of the pressing member 16 (the pressing tip portion 16a) is abutted and further pressed against the upper metal plate 32, the pressing member 16 retracts (ascends) against a biasing force of the compression coil spring 20 (see FIG. 1) and become flush with the tip surfaces of the probe 12 and the shoulder member 14 (see FIG.3B). The tip surfaces of the probe 12 and the shoulder member 14 being rotated at the high speed are contacted with or pressed against the stacked portions, whereby frictional heat is generated on the metal plate 32 side. Furthermore, in the situation in which the metal plate 32 is softened due to the frictional heating, the probe 12 is inserted as shown in FIG. 3C. Then, due to frictional heating effect added by the probe 12, a friction stir region 36 is formed across the two metal plates 32 and 34, whereas the shoulder member 14 is retracted and the probe 12 is inserted (protruded), whereby redundant material of the friction stir region 36 is absorbed into a space formed by the retraction of the shoulder member 14. In this way, while the pressing member 16 arranged outwardly of the shoulder member 14 presses the surface of the metal plate 32 which becomes an outer peripheral portion of the friction stir region 36, the material is absorbed by retracting the shoulder member 14. Thereby, the occurrence of burrs can be more effectively suppressed.

Figure 4A:
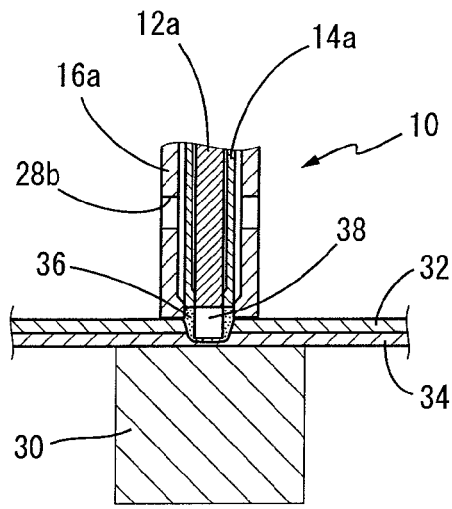
FIG. 4 are illustrations showing a second half of process of the method of friction stir spot welding following FIG. 3, in which 4A, 4B and 4C are explanatory views showing a form of each step respectively.
Figure 4B:
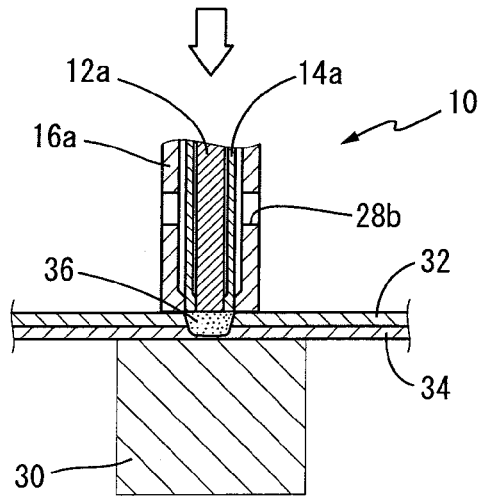
Figure 4C:
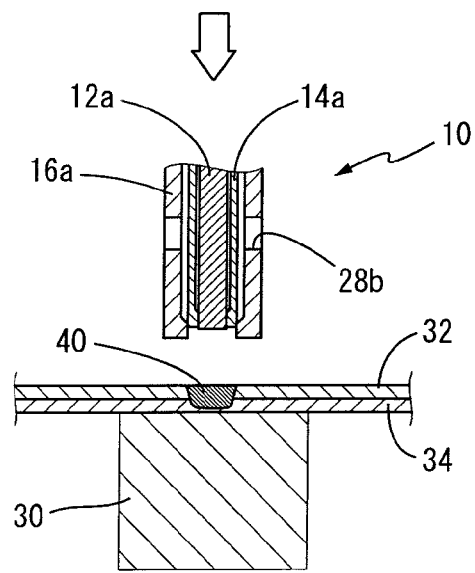

Next, when the probe 12 is retracted from the state in FIG. 3C, there is a left hole from which the probe 12 is removed, namely, a probe hole 38 is left in the friction stir region 36, as shown in FIG. 4A. Thus, simultaneously with the retraction of the probe 12 or thereafter, the shoulder member 14 is moved ahead (ascends) to press an upper surface of the friction stir region 36 at the shoulder surface 14c of the tip surface of the shoulder member 14 to allow the material of the friction stir region 36 around the hole to flow into the probe hole 38 so as to bury the probe hole 38 and fill it, as shown in FIG. 4B. After that, as shown in FIG. 4C, the rotary tool 10 is retracted upwardly and the stacked two metal plates 32 and 34 are strongly joined with an effective joint strength by a joint portion 40 provided at the friction stir region 36 without the probe hole 38.

The method of friction stir spot welding described above is just one example and it can be implemented according to publicly known various methods. There may be a modified example of the exemplified method, in which, instead of the step shown in FIG. 3B, only the probe 12 may be protruded (in which the shoulder member 14 may not be abutted against the metal plate 32 and a predetermined space may be formed therebetween). Then, the probe 12 may be abutted against the metal plate 32 to generate frictional heat so as to soften the plate and may be inserted as shown in FIG. 3C so as to form the friction stir region 36. This can more effectively prevent the occurrence of troubles due to the adhesion between the shoulder member 14 and the pressing member 16. In addition, when the rotary tool 10 is removed as shown in FIG. 4C from the state in which the probe hole 38 is completely filled as shown in FIG. 4B, the probe 12 is slightly protruded (ascended in the drawing) in the state of FIG. 4B. Thereby, while successfully separating the adhesion between the shoulder member 14 and the work pieces 32 and 34 and the adhesion between the pressing member 16 and the work pieces 32 and 34, the entire rotary tool 10 can be effectively removed. Therefore, it is a favorably employed method in the present invention.

In the method of friction stir spot welding, the rotary tool 10 according to the present invention can be used favorably to suppress or solve problems caused by the entry of material into the gap between the probe 12 and the shoulder member 14 and the gap between the shoulder member 14 and the pressing member 16. In the present invention, after the friction stir spot welding operation is performed, the probe 12 and the shoulder member 14 and/or the shoulder member 14 and the pressing member 16 included in the rotary tool 10 are repeatedly inserted and extracted so as to be moved (reciprocated) axially relatively to each other so as to facilitate ejection of the material debris flowing and accumulating or adhering in the gaps between the members from the friction stir region 36. The operation can be advantageously employed.

Figure 5A:
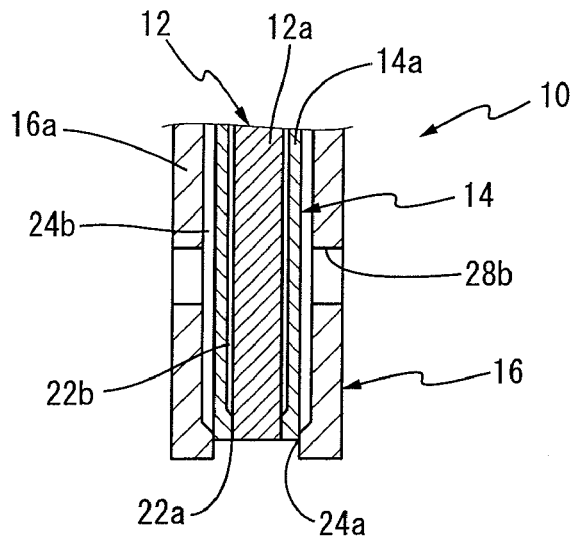
FIG. 5 are illustrations showing an example of process for facilitating ejection of material debris in the rotary tool used in the method of friction stir spot welding according to the present invention, in which 5A, 5B and 5C are explanatory views showing a form of each step respectively.
Figure 5B:
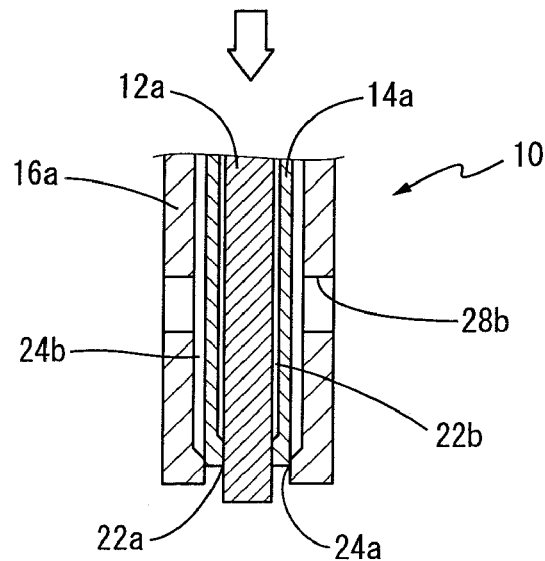
Figure 5C:
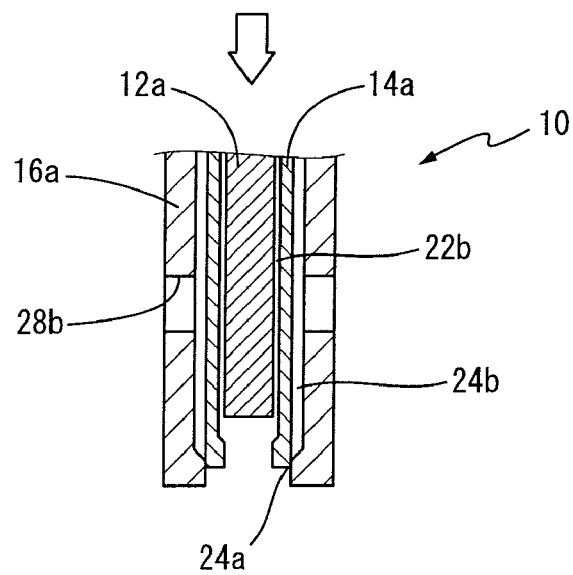

FIG. 5 illustrates a process for facilitating the ejection operation of the material debris. In FIG. 5A, the rotary tool 10 is in a state where the friction stir spot welding operation is completed. Then, the probe 12 is protruded as in FIG. 5B or retracted as in FIG. 5C. The protrusion and retraction thereof are repeated appropriate times, so that the material (debris) clogged or adhered in the gap between the probe 12 and the shoulder member 14 can be effectively ejected outside. Obviously, also between the shoulder member 14 and the pressing member 16, the similar relative insertion and extraction movements allow effective ejection of the material (debris) present in the gap therebetween. Furthermore, the material (debris) can be more effectively ejected by performing together the relative insertion and extraction operations between the probe 12 and the shoulder member 14 and between the shoulder member 14 and the pressing member 16.

The relative insertion and extraction movement between the probe 12 and the shoulder member 14 and the relative insertion and extraction movement between the shoulder member 14 and the pressing member 16 can be performed respectively with appropriately determined lengths of strokes. As shown in FIG. 5C, the probe 12 may be retracted until it enters the enlarged gap 22b in the shoulder member 14 or may be reciprocated in a range of the length (x) of the small gap 22a. Furthermore, regarding frequencies of the insertion and extraction movements, a plurality of frequencies effective to eject the material (debris) from a target gap may be selected appropriately.

Particularly, in the present invention, preferably, the above insertion and extraction movements are performed, after the friction stir spot welding operation (joining at a single spot) using the rotary tool 10 is repeated a plurality of times, in order to improve efficiency in the spot welding operation. Then, by ejecting the material (debris) after each completion of the plurality of times of the friction stir spot welding operations, continuous workability of the friction stir spot welding can be favorably improved. Moreover, it is possible to perform the above-described insertion and extraction movement operation by detecting phenomena such as increases in resistances of rotation driving sections of the probe 12 and the shoulder member 14.

As above, the typical embodiment of the present invention has been described in detail. However, the embodiment is to be considered as an exemplification of the invention and it should be understood that the present invention is not limited to the detailed description relating to the embodiment.

For example, in the above embodiment, the rotary tool 10 has the structure in which the pressing member 16 is disposed outwardly of the shoulder member 14. The structure significantly contributes to the suppression of the occurrence of burrs during the friction stir spot welding. However, the present invention does not necessarily require the pressing member 16. Alternatively, it is possible to provide the pressing member 16 in the rotary tool with a structure as shown in FIG. 6.

Figure 6:
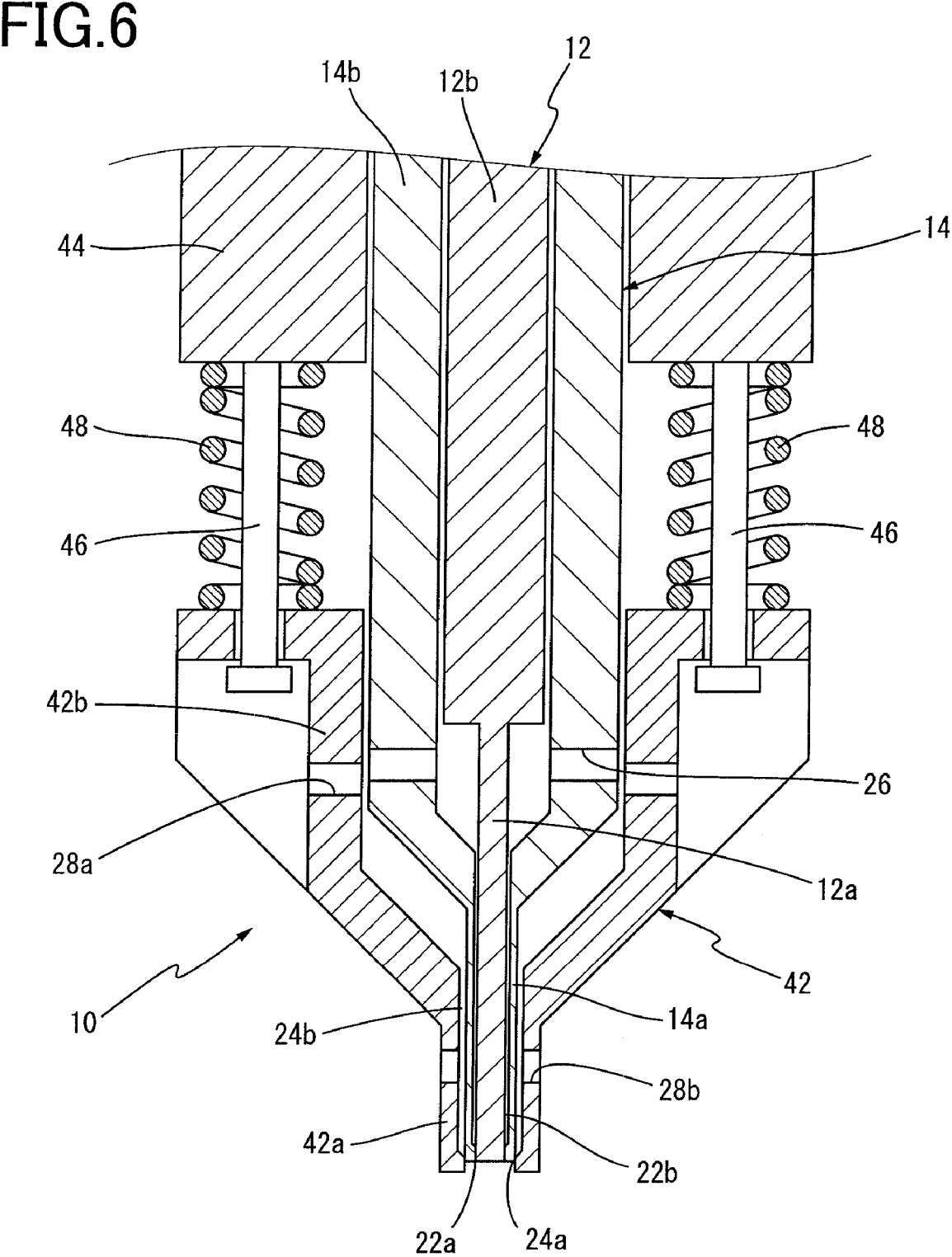
FIG. 6 is an elevational view in axial cross section showing an example of the rotary tool for friction stir spot welding according to the present invention, which corresponds to FIG. 1.

Specifically, in the structure of the rotary tool 10 shown in FIG. 6, a pressing member 42 is disposed movably within a range restricted in axial direction by a stay 46 positioned at each of a plurality of places in a circumferential direction with respect to a supporting member 44 provided at a fixed position. Additionally, a compression coil spring 48, which is penetrated through by the stay 46, is disposed between the pressing member 42 and the supporting member 44 so as to allow the spring to apply a biasing force downwardly in the drawing to the pressing member 42. The structures of the other parts of the rotary tool 10 shown in FIG. 6 are the same as those illustrated above. Thus, the same reference numerals are given to the same parts and detailed explanations thereof are omitted.

Furthermore, in the illustrated example, the present invention is applied to both of the gap between the probe 12 and the shoulder member 14 and the gap between the shoulder member 14 and the pressing member 16, which provides the gap structure formed by the combination of the small gaps 22a and 24a and the enlarged gaps 22b and 24b. However, the present invention may be applied to either one of the small or enlarged gaps.

Still furthermore, in the illustrated example, in order to form the enlarged gaps 22b and 24b, the stepped surface structure is formed in which the inner peripheral surfaces of the shoulder member 14 and the pressing member 16 have the larger diameter on the base portion side. Instead of or along with that, it is also possible to form a stepped surface with a diameter smaller on the base portion side than on the tip side on each of the outer peripheral surfaces of the probe 12 and the shoulder member 14, for example, so that the enlarged gaps following the small gaps are formed on the base portion side.

In addition, in the illustrated example, the present invention is described in the example that plate materials of the metal plates 32 and 34 are used as the metal members to be joined by friction stir spot welding. However, the shape of the metal members to be joined is not limited to the plate material. Any members can be employed as long as the stacked portions subjected to the friction stir spot welding are plate-shaped or faceplate-shaped.

Although no further details are given, the present invention may be embodied with various modifications, changes and alterations based on the knowledge of those skilled in the art. Furthermore, it is obvious that such embodiments are to be considered within the scope of the present invention without departing from the spirit thereof.

EXAMPLES

Hereinafter, to further clarify the present invention, typical examples of the present invention will be described. It is to be understood that the present invention is not limited to the details of these examples and the foregoing description.

Example 1

First, two sheets of plates were prepared as metal members to be joined. Each of them was made of a 6000-series aluminum plate material (6016-T4) with a thickness of 1 mm. In addition, the rotary tool 10 having the double-acting structure shown in FIG. 1 and FIG. 2 was prepared that has the small gaps 22a and 24a with respective axial lengths x and y of 5 mm.

Next, the two aluminum plate members were stacked on each other, and in a state in which the backing jig 30 was abutted against a lower plate, the friction stir spot welding was performed as shown in FIG. 3 and FIG. 4. Specifically, after the pressing member 16 of the rotary tool 10 was abutted against an upper plate side, the probe 12 and the shoulder member 14 being rotated at a high speed were abutted so as to be flush with one another. Next, the probe 12 was inserted into the plates so as to reach up to ⅓ of a thickness of the lower plate to form the friction stir region 36. After that, when retracting the probe 12, the shoulder member 14 was moved ahead to push the friction stir region 36 in so as to bury the probe hole 38. Thereby, the joining of the two aluminum plate was performed in such a way that the probe hole 38 was not left on a surface of the joint portion 40. As a result, since the pressing member 16 suppressed the occurrence of burrs on the outer periphery of the shoulder member 14, friction stir spot welding without occurrence of burrs was achieved. In addition, the joint portion 40 had a surface having unevenness with a level of 0.05 mm or below, which was acceptable as a substantially flat surface, and the back surface thereof was also approximately flat and sound.

Then, 100 points of spots welding was performed, in other words, the above friction stir spot welding was continuously repeated 100 times. After the spot welding, aluminum (material) adhered in the gap between the probe 12 and the shoulder member 14 of the rotary tool 10, and thereby a load for double-acting or reciprocating the probe 12 increased. As a result, a limiter operated to stop the apparatus. Accordingly, in the rotary tool 10, as shown in FIG. 5, 10 times of insertion and extraction movements (reciprocating movements) were performed between the probe 12 and the shoulder member 14 and between the shoulder member 14 and the pressing member 16, respectively, in a range of 10 mm axially and relative to each other. In this manner, aluminum debris were all ejected from the tip of the rotary tool 10 and the holes 26, 28a and 28b of the body thereof, whereby the probe 12, the shoulder member 14 and the pressing member 16 returned in the same condition as that in a first point of spot welding. Then, friction stir spot welding using the rotary tool 10 was performed, and it was possible to perform further continuous 100 points of spot welding.

Comparative Example 1

A friction stir spot welding operation using a rotary tool was performed in the stacked portions of two aluminum plate members on the same manner as in the Example 1, with the exception that the rotary tool did not include the enlarged gaps 22b and 24b (thus, the small gaps 22a and 24a were the only clearances) and the ejection holes 26, 28a and 28b of the body portion. As a result, significant adhesion of aluminum occurred by continuous 15 points of spot welding, which increased insertion and extraction loads of the rotary tool and thus the apparatus was stopped by the operation of the limiter. In this situation, the insertion and extraction operation was performed between the probe 12 and the shoulder member 14 and between the shoulder member 14 and the pressing member 16, respectively. Nevertheless, due to a strong adhesion of the aluminum, the removal of aluminum debris was insufficient.

What is claimed is:

1. A rotary tool for friction stir spot welding comprising:
a rod-like probe to be inserted into one side of stacked planar portions of a plurality of metal members to be joined while being rotated;
a cylindrical shoulder member which is disposed outwardly of the probe so as to be located coaxially with the probe and which has a shoulder surface to be abutted against a surface of the one side of the stacked portions while being rotated; and
a cylindrical pressing member disposed coaxially outwardly of the shoulder member, with a tip surface of the pressing member being pressed against the surface of the one side of the stacked portions by a biasing force applied in an axial direction of the pressing member;
wherein the probe and the shoulder member are individual components respectively and are disposed so as to have a double-acting structure which enable the probe and the shoulder member to move independently in their axial direction;
wherein a first gap between an inner peripheral surface of the shoulder member and an outer peripheral surface of the probe is formed to have a first small gap on a tip side of the rotary tool and is formed to have a first enlarged gap having larger clearance than the first small gap on a base portion side thereof;
wherein a second gap between an inner peripheral surface of the pressing member and an outer peripheral surface of the shoulder member is formed to have a second small gap on the tip side of the rotary tool and is formed to have a second enlarged gap having larger clearance than the small gap on the base portion side thereof.

2. A rotary tool for friction stir spot welding according to claim 1, wherein a surface of transition from a small-diameter portion up to a large-diameter portion on the inner peripheral surface of the shoulder member is formed as an inclined plane.

3. The rotary tool for friction stir spot welding according to claim 1, wherein the first small gap is formed with a length of 0.1 to 10 mm axially from the tip.

4. The rotary tool for friction stir spot welding according to claim 1, wherein the second small gap is formed with a length of 0.1 to 10 mm axially from the tip.

5. The rotary tool for friction stir spot welding according to claim 1, wherein an ejection hole penetrating through a cylindrical wall of the shoulder member is formed in an enlarged gap formation region of the shoulder member so as to eject material debris of the metal members to be joined entered through the first small gap outwardly through the ejection hole.

6. The rotary tool for friction stir spot welding according to claim 1, wherein an ejection hole penetrating through a cylindrical wall of the pressing member is formed in a formation region of the enlarged gap of the pressing member so as to eject material debris of the metal members to be joined entered through the second small gap outwardly through the ejection hole.

7. A rotary tool for friction stir spot welding comprising:
a rod-like probe to be inserted into one side of stacked planar portions of a plurality of metal members to be joined while being rotated;
a cylindrical shoulder member which is disposed outwardly of the probe so as to be located coaxially with the probe and which has a shoulder surface to be abutted against a surface of the one side of the stacked portions white being rotated; and
a cylindrical pressing member disposed coaxially outwardly of the shoulder member, and a tip surface thereof to be pressed against the surface of the one side of the stacked portions by a biasing force applied in its axial direction,
wherein the probe and the shoulder member are individual components respectively and are disposed so as to have a double-acting structure which enable the probe and the shoulder member to move independently in their axial direction, and
wherein a gap between an inner peripheral surface of the pressing member and an outer peripheral surface of the shoulder member is formed to have a small gap on a tip side of the rotary tool and is formed to have an enlarged gap having larger clearance than the small gap on a base portion side thereof.

8. The rotary tool for friction stir spot welding according to claim 7, wherein a surface of transition from a small-diameter portion up to large-diameter portion on the inner peripheral surface of the pressing member is formed as an inclined plane.

9. The rotary tool for friction stir spot welding according to claim 7, wherein the small gap is formed with a length of 0.1 to 10 mm axially from the tip.

10. The rotary tool for friction stir spot welding according to claim 7, wherein an ejection hole penetrating through a cylindrical wall of the pressing member is formed in a formation region of the enlarged gap of the pressing member so as to eject material debris of the metal members to be joined entered through the small gap outwardly through the ejection hole.

11. An apparatus for friction stir spot welding comprising the rotary tool for friction stir spot welding according to claim 1.

12. An apparatus for friction stir spot welding comprising the rotary tool for friction stir spot welding according to claim 7.

13. A method of friction stir spot welding using the rotary tool for friction stir spot welding according to claim 1, the method comprising the steps of:
  performing a friction stir spot welding operation on stacked planar portions of a plurality of metal members to be joined; and
  repeating insertion and extraction movements of the probe and the shoulder member in their axial direction relative to each other so as to facilitate ejection of the material debris of the metal members to be joined that are flown into the gap from a friction stir region of the stacked portions and accumulated or adhered thereinto.

14. A method of friction stir spot welding using the rotary tool for friction stir spot welding according to claim 1, the method comprising the steps of:
  performing a friction stir spot welding operation on stacked planar portions of a plurality of metal members to be joined; and
  repeating insertion and extraction movements of the shoulder member and the pressing member in their axial direction relative to each other so as to facilitate ejection of the material debris of the metal members to be joined that are flown into the gap from a friction stir region of the stacked portions and accumulated or adhered thereinto.

15. A method of friction stir spot welding using the rotary tool for friction stir spot welding according to claim 7, the method comprising the steps of:
  performing a friction stir spot welding operation on stacked planar portions of a plurality of metal members to be joined; and
  repeating insertion and extraction movements of the shoulder member and the pressing member in their axial direction relative to each other so as to facilitate ejection of the material debris of the metal members to be joined that are flown into the gap from a friction stir region of the stacked portions and accumulated or adhered thereinto.

16. The method of friction stir spot welding according to claim 13, wherein the operation of the insertion and extraction movements is performed after the friction stir spot welding operation is performed a plurality of times.

17. The method of friction stir spot welding according to claim 14, wherein the operation of the insertion and extraction movements is performed after the friction stir spot welding operation is performed a plurality of times.

18. The method of friction stir spot welding according to claim 15, wherein the operation of the insertion and extraction movements is performed after the friction stir spot welding operation is performed a plurality of times.

* * * * *